United States Patent [19]
Rother

[11] 3,932,708
[45] Jan. 13, 1976

[54] FREQUENCY-SELECTIVE SIGNAL RECEIVER FOR COMMUNICATION EQUIPMENTS, MORE PARTICULARLY TELEPHONE EQUIPMENTS

[75] Inventor: Klaus-Dieter Rother, Planegg, Germany

[73] Assignee: Siemens Aktiengesellschaft, Munich, Germany

[22] Filed: Sept. 20, 1973

[21] Appl. No.: 399,337

[30] Foreign Application Priority Data
Sept. 28, 1972 Germany............................ 2247575

[52] U.S. Cl. ............................................ 179/84 VF
[51] Int. Cl.² .......................................... H04M 1/50
[58] Field of Search.............. 179/84 VF; 340/171 R; 328/138

[56] References Cited
UNITED STATES PATENTS

| | | | |
|---|---|---|---|
| 3,128,349 | 4/1964 | Boesch et al. .................. | 179/84 VF |
| 3,582,562 | 6/1971 | Sellari ............................ | 179/18 AD |
| 3,582,565 | 6/1971 | Beeman et al. ................. | 179/84 VF |
| 3,770,900 | 11/1973 | Morlec ............................ | 179/84 VF |
| 3,812,432 | 5/1974 | Hanson ............................ | 328/138 |

Primary Examiner—Kathleen H. Claffy
Assistant Examiner—Joseph Popek
Attorney, Agent, or Firm—Schuyler, Birch, Swindler, McKie & Beckett

[57] ABSTRACT

In a frequency-selective signal receiver for receiving at least two multi-frequency group codes and equipped with a voice-frequency trap, a broad-band frequency detector and a narrow-band frequency detector are connected in series parallel relative to the frequency coded input signal whereby the receiver channels of the narrow-band frequency detector provided for each single frequency of interest are activated when a conicidence between signals of two groups occurs. Due to the short transient response time of the broad-band frequency detector, character recognition is possible after a short time. The narrow-band frequency detectors are individually adjustable so that in the signal receiver particularly threatened frequency channels can correspondingly be taken into account.

7 Claims, 5 Drawing Figures

FREQUENCY-SELECTIVE SIGNAL RECEIVER FOR COMMUNICATION EQUIPMENTS, MORE PARTICULARLY TELEPHONE EQUIPMENTS

BACKGROUND OF THE INVENTION

The invention relates to a frequency-selective signal receiver equipped with a voice-frequency trap and employed in communication equipment, more particularly telephone equipment, having a clipping circuit at the input thereof, wherein the signals to be received consist of several simultaneously appearing single frequencies.

The difficulty in receiving purely audio-frequency code dialing signals consists in screening out undesired signals by means of a voice-frequency trap that attenuates undesired signals but does not suppress the desired signals; such desired signals may be accompanied by noise levels caused by dial tones, announcements or other noise. In prior art devices of this type the noise level for each group of frequencies is fed to a common noise detector in the voice-frequency trap sections of the signal receivers. As a result, the interpreting threshold is allocated to all frequency channels so that individual frequency trapping for each frequency channel is not possible. Particularly threatened channels i.e. channels particularly likely to carry undesired signals cannot be monitored according to their exposure to danger. Moreover, the reciprocal action of the frequency groups caused by the finite stopband attenuation of the group filters cannot be taken into account.

Frequency-selective signal receivers equipped with a voice-frequency trap have been proposed in the past wherein rectangular voltages derived from the signal frequencies are fed sequentially in cycles to a common detector circuit, and wherein the particular frequency is determined through counting; thus the counting circuit for determining the frequency is also part of a voice-frequency trap circuit which compares the count values for two consecutive half waves. The disadvantage of such signal receivers resides in the fact that detector circuits must be utilized having a receiver channel with a very narrow bandwidth for each single frequency occurring so as to ensure adequate voice frequency trapping. Due to the use of such narrow-band receiver channels, comparatively long transient response times are required which render rapid character recognition impossible.

SUMMARY OF THE INVENTION

It is an object of the invention to provide a frequency-selective signal receiver of the type referenced at the start of this application equipped with a voice-frequency trap which renders rapid character recognition possible and wherein a separate voice-frequency trap can be assigned to each frequency channel.

In accordance with the invention, the foregoing and other objects of the invention are achieved by routing the received frequencies to a first frequency detector having a receiver channel of large bandwidth for each single frequency; the recognized single frequencies, when the necessary concurrently appearing single frequencies are present, activate receiver channels assigned thereto; and having a narrow bandwidth second frequency detector, said second frequency detector producing disabling criteria for inhibiting the signal output of the receiver by comparing at least two half cycles of the rectangular voltages allocated to the single frequencies being considered by the second detector.

Broad-band channel filters may be employed in the signal receiver according to the invention for the first frequency detector. Due to the short transient response time of such broad-band channel filters, character recognition is possible after the shortest time possible. The second frequency detector which forms the actual voice-frequency trap circuit of the signal receiver has several receiver channels of narrow band-width which are assigned to the individually occuring frequencies. It is possible to adjust the narrow bandwidth of the second frequency detector individually for each single frequency occuring so that particularly threatened channels can be specially considered. Moreover, the reciprocal action of the frequency groups brought about by the finite stopband attenuation of the group filters can be taken into account.

An especially advantageous embodiment of the invention is characterized by the fact that rectangular voltages assigned to the single frequencies are routed to a counter which starts a new counting process after each voltage slope change. The counter has outputs which are assigned to the appearing half cycles of the single frequencies; a signal appears at one of these outputs after the number of counting pulses allocated to the individual half cycles of that frequency are exceeded, said signal output being activated by the single frequencies recognized by the first frequency detector with a view to disabling the signal output of the receiver. Thus, by fixing the counting limits, a simple procedure is afforded for monitoring the admissible signal frequency tolerances of the receiver.

The supervision of the admissible signal frequency tolerances in the above described embodiment is based on the assumption that a clock frequency is generated in the signal receiver which is routed to the counter. A further embodiment of the invention for signal receivers in which there is no clock frequency applied to a counter is distinguished by the fact that rectangular voltages assigned to the single frequencies are routed to a monostable multivibrator which, after each slope change, sends a positive pulse of specified duration to the inputs of delay circuits, each of whose delay times corresponds to half the period of the single frequencies being detected. When the delay times are exceeded, a signal appears at the output of the particular delay circuit, said signal being passed through by the single frequencies recognized by the first frequency detector for the purpose of disabling the signal output of the receiver.

BRIEF DESCRIPTION OF THE DRAWINGS

The principles of the invention will be more readily understood by reference to the description of a preferred embodiment given hereinbelow in conjunction with the drawing which comprises a schematic diagram of a frequency-selective signal receiver provided with a voice-frequency trap and constructed according to the invention, wherein.

DESCRIPTION OF PREFERRED EMBODIMENT

Figure 1:
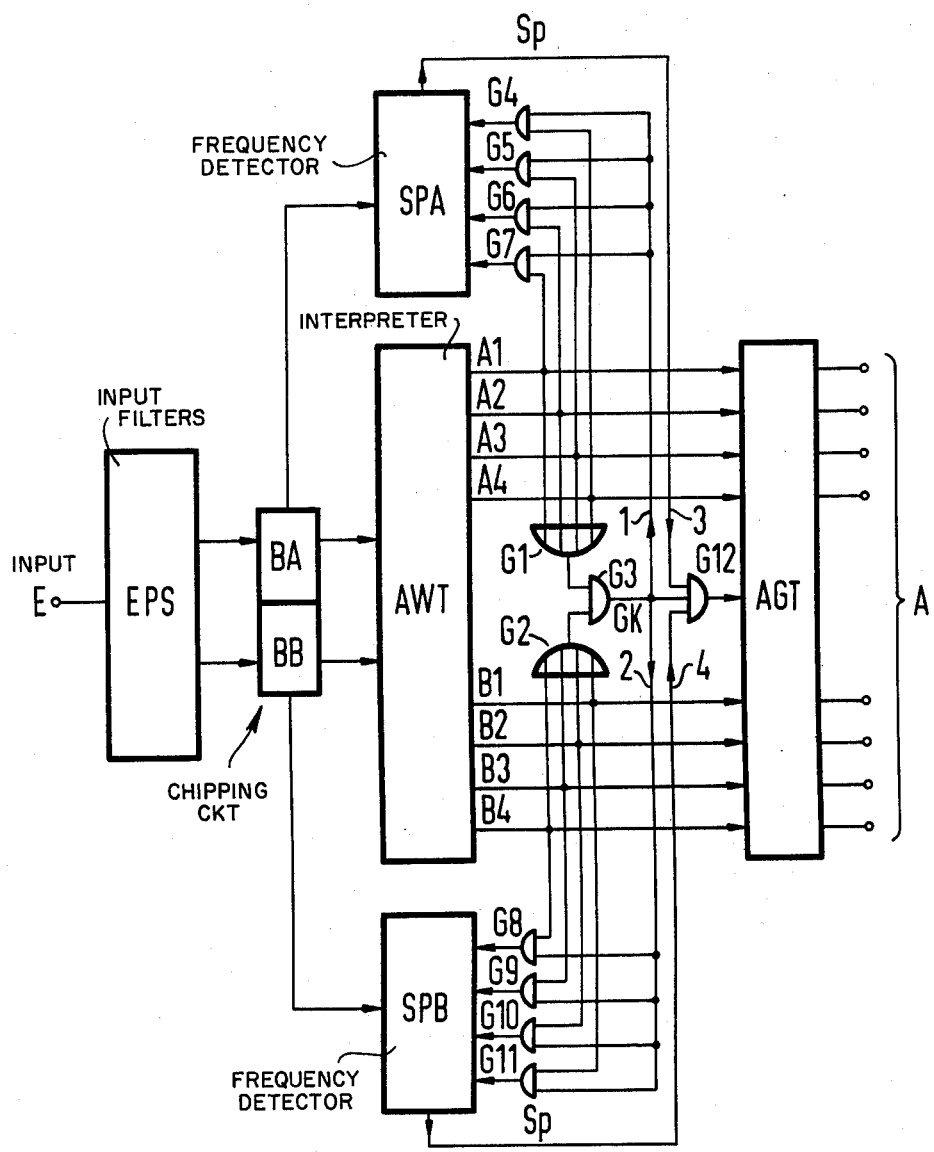
FIG. 1 is a block diagram of a frequency-selective signal receiver equipped with a voice-frequency trap according to the invention.

FIG. 1 shows the schematic diagram of a frequency-selective signal receiver for telephone equipments which is designed for receiving a two-group code. At first, the received signal travels over the input E to an input section EPS in which it is amplified and separated according to the group to which it belongs. The output signal of the group filters of section EPS is routed to the clipping circuits BA and BB. In the clipping circuits the received signal voltage is converted into a rectangular voltage having a constant amplitude. This rectangular voltage is routed to the second frequency detectors SPA, SPB and the interpreting section AWT.

In the interpreting section AWT (the first frequency detector with broad-band channel filters), the single frequency is recognized and accordingly activates one of the outputs A1 to A4 and B1 to B4. If there is at least one output signal for each frequency group, a signal is applied to the output of the AND gate G3 also. This output signal indicating a group coincidence is sent to the input gates G4 to G11 of the second frequency detectors SPA and SPB. At the same time, the output signals A1 to A4 and B1 to B4 are sent to the input gates G4 to G11 allocated thereto which then activate the pertinent receiver channel of the second frequency detectors.

As long as no inhibiting signal arises in the second frequency detectors which are acting as a voice-frequency trap section, a signal is applied to all three inputs of the AND gate G12. The output signal of the gate G12 is routed to the output section AGT of the signal receiver and causes the received signal to be passed through if within a predetermined protected time no inhibiting signal is received from the voice-frequency trap sections at the inputs of the gate G12.

Figure 2:
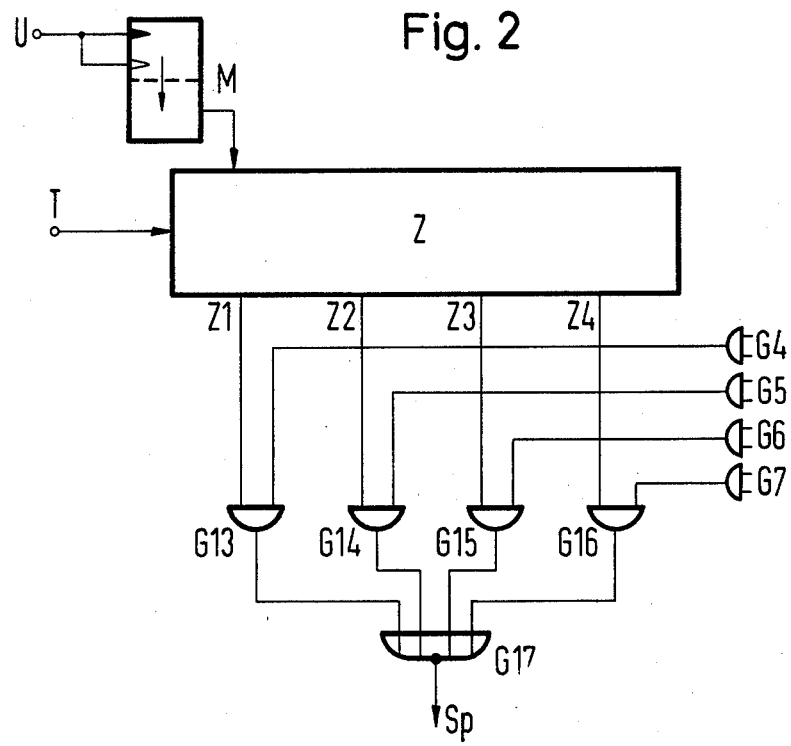
FIG. 2 is a block diagram of a second frequency detector forming the actual voice-frequency trap section wherein a clock-actuated counter is employed in accordance with one embodiment of the invention.

FIG. 2 shows the construction of a second frequency detector in which a counter Z is employed. The rectangular voltage supplied by the clipping circuits BA or BB and corresponding to the single frequencies travels over the input U to a monostable multivibrator (monoflop) M which provides a spike every time the slope of the rectangular voltage changes. This spike lasts only until a safe resetting of the counter Z can be ensured. The received frequency is calculated by timing the half cycles of the rectangular voltages. The counter has to be divided into as many areas as there are signal frequencies for each frequency group. In the described example, it is assumed that there are four single frequencies for each signal group so that the counter has four outputs Z1 to Z4. If Z1 corresponds, for example, to the frequency fo=697 Hz, the counting limit of 732 $\mu$s is obtained with, say, a 2% deviation from the mean frequency. By heterodyning the useful signal with spurious signals there arise beat frequencies which, in addition to the pulse repetition period, change the pulse duty factor of the rectangular voltage. Now, if a half cycle is so long that Z1 is reached by a monoflop pulse without prior resetting, a signal is provided at the counter output Z1. This signal passes through over the gate G13 if the output signal of the gate G4 is applied to the second input of the gate G13, and the gate G17 then provides an inhibiting signal at the output thereof to the gate G12.

Figure 4:
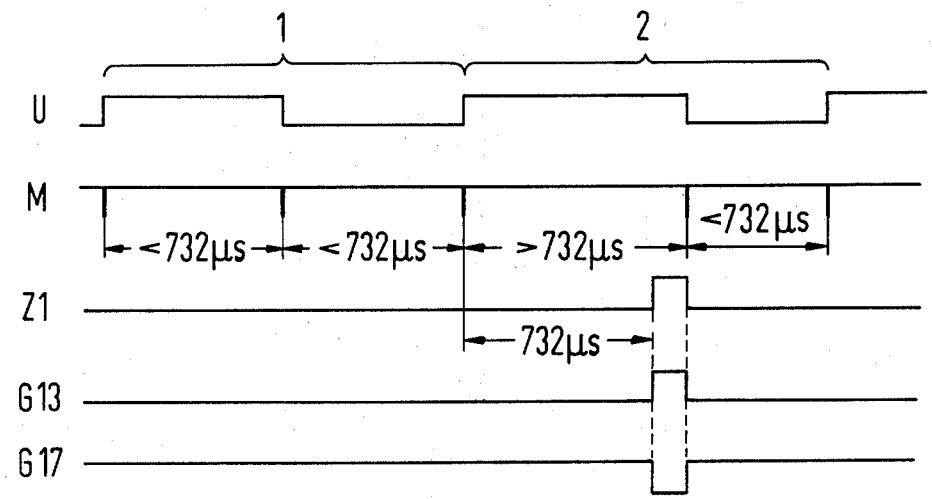
FIGS. 4 and 5 comprise diagrams showing the modes of operation of the frequency detectors depicted in FIGS. 1-3.

The mode of operation of the frequency detector described hereinabove is apparent from the FIG. 4 where the rectangular voltage is labeled U. Two possible cases have been singled out. In the first case, the half cycles are of equal duration and in the second case they are of unequal duration. The spikes supplied by the monoflops upon each change in slope of the rectangular voltage are labeled M. In this example, it is assumed that a signal of frequency 697 Hz is received in one group. If the spike appears at the input of the counter Z prior to the expiration of 732 $\mu$s, no signal appears at the output Z1; but if, as in the second case, no signal M is applied to the counter from monoflop after 732 $\mu$s then a signal appears at the output Z1 from the expiration of 732 $\mu$s until the next spike M from the monoflop. This pulse travels through, as explained hereinabove, over the gates G13 and G17 and gives rise to a disabling signal at the output gate G12 the receiver.

Figure 3:
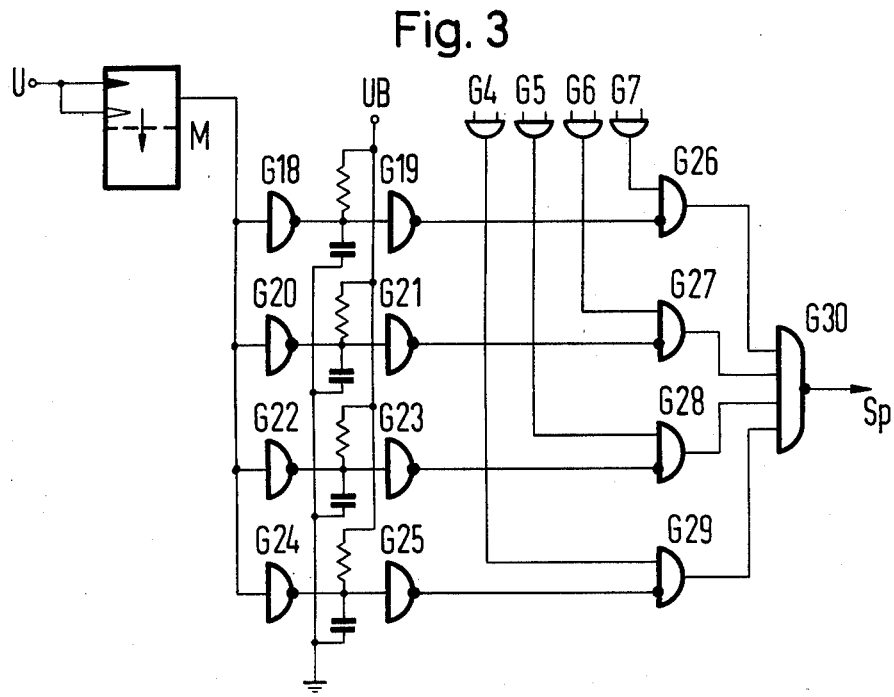
FIG. 3 shows the construction of an alternative embodiment of the second frequency detector of the signal receiver wherein delay circuits are utilized in the place of the counter.
Figure 5:
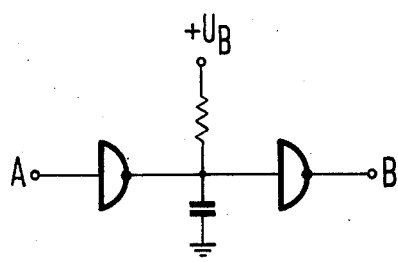
Figure 5:
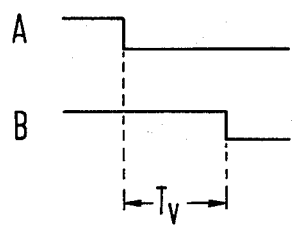

FIG. 3 shows the construction of a second frequency detector for a signal receiver in which no counter or clock frequency is provided. The monostable multivibrator M to whose input U the rectangular voltage is sent supplies a positive going pulse each time the slope of the rectangular voltage changes, which pulse is led to the inputs of the gates G18 to G24. The gates G18 and G19 form in conjunction with a resistor and a capacitor a delay line whose mode of operation is apparent from FIG. 5. Likewise, the remaining gates form delay circuits. Each of the delay times corresponds to the duration of the appearing half cycles of the single frequencies to be recognized. It is obvious that the mode of operation of the frequency detector is analogous to that of the frequency detector shown in FIG. 2.

The description of a preferred embodiment of the invention given hereinabove is only exemplary of the principles of the invention and does not define the scope of the invention. The scope of the invention is defined by the appended claims:

I claim:

1. A telephone equipment frequency-selective signal receiver for receiving a multi-frequency group code having means for detecting signals including other than certain desired frequencies, wherein the signals received comprise several simultaneously occurring single frequencies, said received signals being applied to clipping means for conversion to a rectangular waveform, said receiver including first frequency detection means having a broad bandwith frequency detector for each desired frequency of said group and responsive to said simultaneously occuring single frequencies in said rectangular waveform for detecting said single frequencies in said received signal and indicating the occurrence of at least one desired frequency, an output section having an activating gate coupled to the output of said first frequency detecting means and responsive to said indication from said first frequency detecting means, second multi-channel detection means having a narrow bandwidth frequency detector assigned to each of said desired frequencies and responsive to two successive half-cycles of said rectangular waveform representing each of said single frequencies for indicating that at least one of said received simultaneously occurring single frequencies is not a member of said group, said activating gate being responsive to said indication from said second multi-channel detection means to inhibit the response of said output section to said first frequency detecting means, and second gate means responsive to said indication from said first frequency detection means for actuating said second frequency detection means.

2. A frequency selective receiver as claimed in claim 1 wherein said output section is initially responsive to said indication from said first detection means of simultaneous occurrence to allow output of said received signal, and secondarily responsive to said second detection means indicating at least one received signal frequency is not a member of said one group for preventing an output of said received signal.

3. A signal receiver as claimed in claim 1 wherein said second frequency detection means comprises a counter having an area assigned to each frequency of said one group, each said counter area being responsive to each slope change of the rectangular voltage waveform representing the signal frequency assigned to said each area to restart the counting process, each said counting area receiving said rectangular waveform providing an output signal in response to the count in said counting area between successive slope changes in said received rectangular waveform differing from the count representing the assigned frequency of said area, and gate means responsive to said counting area signal and said detected single frequencies of said first detecting means to provide said counting area signal to said output preventing means.

4. A signal receiver as claimed in claim 3 including a monostable multivibrator coupled between said clipping means and said second detection means for providing spike signals indicating said slope changes in said rectangular waveforms to said counting areas for starting and stopping the count in said counting areas.

5. A signal receiver as claimed in 1 wherein said second detection means comprises a plurality of delay circuits, one of said delay circuits being assigned to each frequency of said one group, each of said delay circuits having a delay time corresponding to one-half the period of the assigned single frequency, and coincidence gate means receiving an output from one of said delay lines exceeding said delay time coinciding with a signal representing one of said detected single frequencies from said first detection means for providing said delay line output signal to said output preventing means.

6. A signal receiver as claimed in claim 5 including a monostable multivibrator coupled between said clipping means and said second detection means and responsive to each said slope change of said rectangular waveforms for providing an input signal of appropriate duration to said delay circuits of said second detection means.

7. A receiver as claimed in claim 1 wherein said second gate means are responsive to the output of said first detection means to activate only the detectors appropriate to the frequencies detected by said first frequency detector.

* * * * *